(12) United States Patent
Matsumoto et al.

(10) Patent No.: US 11,306,528 B2
(45) Date of Patent: Apr. 19, 2022

(54) PROTECTOR WITH SENSOR

(71) Applicants: NISHIKAWA RUBBER CO., LTD., Hiroshima (JP); AISIN SEIKI KABUSHIKI KAISHA, Kariya (JP)

(72) Inventors: Michihiko Matsumoto, Hiroshima (JP); Wataru Hattori, Kariya (JP)

(73) Assignees: NISHIKAWA RUBBER CO., LTD., Hiroshima-ken (JP); AISIN SEIKI KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/016,487

(22) Filed: Sep. 10, 2020

(65) Prior Publication Data

US 2021/0095512 A1 Apr. 1, 2021

(30) Foreign Application Priority Data

Sep. 27, 2019 (JP) .............................. JP2019-176635

(51) Int. Cl.
| | |
|---|---|
| *E05F 15/10* | (2006.01) |
| *E05F 15/44* | (2015.01) |
| *B60J 10/20* | (2016.01) |

(52) U.S. Cl.
CPC .............. *E05F 15/44* (2015.01); *B60J 10/20* (2016.02); *E05Y 2400/54* (2013.01); *E05Y 2900/531* (2013.01)

(58) Field of Classification Search
CPC .......... E05F 15/44; B60J 10/20; B60J 10/273; E05Y 2900/531; E05Y 2400/54; H02G 15/013

USPC ................................ 49/26, 27, 28; 200/61.43
See application file for complete search history.

(56) References Cited

U.S. PATENT DOCUMENTS

| | | | | | |
|---|---|---|---|---|---|
| 5,260,529 | A | * | 11/1993 | Miller | ........................ F16P 3/12 |
| | | | | | 200/61.43 |
| 5,297,360 | A | * | 3/1994 | Besore | .................. F25D 23/087 |
| | | | | | 49/478.1 |
| 5,962,825 | A | * | 10/1999 | Miller | ..................... H01H 3/142 |
| | | | | | 200/61.43 |
| 6,260,418 | B1 | * | 7/2001 | Ishihara | .................. H01H 3/142 |
| | | | | | 73/756 |

(Continued)

FOREIGN PATENT DOCUMENTS

| | | |
|---|---|---|
| JP | 3291233 B2 | 6/2002 |
| JP | 2015020548 A | 2/2015 |

(Continued)

OTHER PUBLICATIONS

U.S. Appl. No. 17/235,221, First Named Inventor: Michihiko Matsumoto; Title: "Protector With Sensor"; filed Apr. 20, 2021.

*Primary Examiner* — Jerry E Redman

(74) *Attorney, Agent, or Firm* — Holtz, Holtz & Volek PC

(57) ABSTRACT

A protector with a sensor couples to a sliding door. A first end of an insert is inserted in and fills up a space on a hollow part of the protector. A second end of the insert includes a support member and a lid. Top ends of core wires and top ends of two leads are fit in first channels on the support member. Covered parts and a wire harness are fit in a second channel. The second channel is formed between the support member and the lid and is continuous with the first channels. The support member and the lid include feeding ports to receive and feed die-molding material into the second channel during die molding.

12 Claims, 9 Drawing Sheets

(56) References Cited

U.S. PATENT DOCUMENTS

| | | | | |
|---|---|---|---|---|
| 6,339,305 B1* | 1/2002 | Ishihara | | E05F 15/44 318/282 |
| 6,571,512 B1* | 6/2003 | Miller | | E05F 15/44 49/27 |
| 7,504,943 B2* | 3/2009 | Takeuchi | | G01L 1/16 318/445 |
| 7,958,672 B2* | 6/2011 | Ishihara | | E05F 15/46 49/26 |
| 9,217,679 B2* | 12/2015 | Ishihara | | H01H 3/142 |
| 9,605,470 B2 | 3/2017 | Matsumoto et al. | | |
| 10,246,927 B2* | 4/2019 | Castello | | E05F 15/42 |
| 2004/0107640 A1* | 6/2004 | Ishihara | | E05F 15/44 49/27 |
| 2012/0079898 A1* | 4/2012 | Castello | | E05F 15/48 73/865.8 |
| 2012/0081130 A1* | 4/2012 | Provenzano | | E05F 15/44 324/649 |
| 2012/0222296 A1* | 9/2012 | Miyamoto | | E05F 15/443 29/825 |
| 2015/0042361 A1* | 2/2015 | Matsuda | | B60J 10/273 324/661 |
| 2015/0267462 A1* | 9/2015 | Matsumoto | | B60J 10/273 73/862.541 |
| 2016/0144802 A1* | 5/2016 | Hirakawa | | E05F 15/44 296/1.08 |
| 2019/0210259 A1 | 7/2019 | Hattori et al. | | |
| 2020/0157872 A1 | 5/2020 | Matsumoto et al. | | |
| 2020/0223295 A1 | 7/2020 | Matsumoto et al. | | |

FOREIGN PATENT DOCUMENTS

| | | |
|---|---|---|
| JP | 6258735 B2 | 12/2017 |
| JP | 2019119420 A | 7/2019 |

\* cited by examiner

PROTECTOR WITH SENSOR

CROSS REFERENCE TO RELATED APPLICATION

This application claims the benefit under 35 USC § 119 of JP Patent Application JP 2019-176635 filed Sep. 27, 2019, the entire disclosure of which is incorporated herein by reference.

BACKGROUND INFORMATION

The present invention relates to a protector with a sensor. When an object including a finger is disposed between an opening of an automobile body and a panel which moves between at least two positions to open and close the opening of the automobile body, the sensor fixed in the protector outputs a corresponding signal upon detecting the object. The panel includes doors such as a sliding door, a back door, and a sun roof, on a wagon, a station wagon, or the like.

A protector 10, 20 with a sensor couples to an automobile including a wagon illustrated in FIG. 7 and an automobile illustrated in FIG. 8. A sliding door 1 (or a back door) of the wagon opens and closes the opening of the automobile body. A sun roof 2 of the automobile opens and closes the opening of the automobile body.

The protector 10 couples to a front end surface of the sliding door 1 and extends toward a front part of the automobile body from the front end surface. The protector 10 extends in an upper and lower direction of the automobile body as illustrated in FIG. 9.

As illustrated in FIG. 10 and FIG. 11, the protector 10, which couples to the front end surface of the sliding door 1, includes an installation base member 11 and a hollow part 12. The installation base member 11 has a substantially U-shaped cross section including an inner-cabin side wall 11a, an outer-cabin side wall 11b and a connecting wall 11c. The hollow part 12 is integrally formed with the installation base member 11. The hollow part 12 includes a sensor (pressure sensitive sensor) S. The sensor S outputs a corresponding electric signal upon detecting the object such as a part of human bodies (fingers, hands, or legs) between the sliding door 1 and the opening of the automobile body (may also be front door or side door) (see, for example, Japanese Patent No. 3291233).

In a lower part of the protector 10, a channel part 13 is integrally formed with the inner-cabin side wall 11a of the installation base member 11. The channel part 13 has a substantially C-shaped cross section and holds a wire harness W. The wire harness W is joined with the pressure sensitive sensor S. The installation base member 11 has a plurality of holding lips 14, 14 formed inside and a core 15 embedded. The core 15 has a substantially U-shaped cross section and increases rigidity of the installation base member 11. In addition, a decorative lip 16 is provided on the outer-cabin side wall 11b of the installation base member 11.

The sensor (pressure sensitive sensor) S is fixed in the hollow part 12. The hollow part 12 has two core wires (electrode wires) 31, 32, rubber like elastic bodies 34, 35, and a space 33. The core wires 31, 32 extend in an upper and lower direction (longitudinal direction) and are embedded in the rubber like elastic bodies 34, 35. The rubber like elastic bodies 34, 35 have conductivity. The space 33 is positioned between the rubber like elastic bodies 34, 35. When the object is disposed between the sliding door 1 and the opening as the sliding door 1 is moved towards a closed position and the object makes contact with a part of the hollow part 12, the object causes the rubber like elastic bodies 34, 35 to contact with each other and the two core wires 31, 32 to short. Resultant change in electric signal is transmitted to a control unit 40 by leads 36, and as a result, the object is detected. The leads 36 are connected with the two core wires 31, 32 in a lower side terminal part of the protector 10 and are joined with the control unit 40. The leads 36 are covered with insulator and are tied by the wire harness W. Top ends of the leads 36 are bared from covered parts 37 and are naked wires.

As illustrated in FIGS. 12(a) to 12(c), in the lower side terminal part of the protector 10, the leads 36 are piled on the two core wires 31, 32 and the leads 36 are connected by means of resistance welding or soft soldering (FIG. 12(b)). The two core wires 31, 32 are drawn out in a longitudinal direction (left direction in FIGS. 12(a) to 12(c) relative to a sheet). Also, an insert 25 fills up the space 33 for the space 33 is exposed in an end part (FIG. 12(c)). Then, wire connection parts M1, the insert 25, and a part of the wire harness W are embedded in a die-molded part by die molding as illustrated in FIG. 13, and are not exposed. The insert 25 fills up the space 33 to prevent die-molding material from flowing into the space 33 and to prevent damages on sensing function. In FIG. 13, dotted lines indicate the die-molded parts.

Injection molding pressure affects the wire connection parts M1, embedded in the die-molded part. In this connection, in the lower side terminal part of the protector 10, the wire connection parts M1 and the leads 36 are firmly fixed to a surface of the insert 25 by adhesive for positioning. With this configuration, the wire connection parts M1 are not exposed from the die-molded part or the wires are not damaged.

This configuration necessitates an extra process of adhesion. In addition, an increased amount of adhesive causes insufficient adhesion. Also, use of adhesive tends to cause unevenness and makes it difficult to stably fix the wire connection parts M1. Further, the wire connection parts M1, once fixed to the surface of the insert 25 by adhesive, are hard to detach for repairment or replacement.

In case the leads 36 are unevenly connected with the two core wires 31, 32, ends of the leads 36 may stick out of the surface of the terminal part.

Japanese Patent No. 3291233 is directed to a metal piece as a clip to fix a connection part between cords. This configuration, however, is time-consuming and is complex, for the metal piece necessitates fixing by welding. In addition, Japanese Patent No. 3291233 does not aim at preventing the die-molding material from flowing into the hollow part or disclose the insert.

In this connection, FIG. 14 illustrates the protector 10. A first end of the insert 50 includes an insertion part 51 and a second end includes a support member 52A, a lid 52B to cover the support member 52A, and a pressing part 54. The insertion part 51 is inserted in the space 33 to fill up the space 33. Wire connection parts M2 are sandwiched in and fixed by the support member 52A and the lid 52B. The wire connection parts M2 are where top ends of the leads 36 are piled on top ends of the two core wires 31, 32. The pressing part 54 locally abuts with the wire connection parts M2. The terminal part is formed by die molding (see Japanese unexamined Patent Publication No. 2015-20548).

Accordingly, in the lower side terminal part of the protector 10, the support member 52A and the lid 52B on the second end of the insert 50, the covered parts 37, and the part of the wire harness W are embedded in the die-molded part and are not exposed.

The insertion part 51 of the insert 50 prevents the die-molding material from flowing into the space 33 of the hollow part 12. Also, the top ends of the leads 36 and the top ends of the two core wires 31, 32 are electrically connected by the support member 52A and the lid 52B, which covers the support member 52A, not bonded directly. This configuration eliminates the need for use of adhesive or wire connection by resistance welding or soft soldering.

Also, with this configuration, exposure of the wire connection parts M2 from the die-molded part or the damage on the wire connection parts M2 due to the injection molding pressure is prevented during die molding. The wire connection parts M2 are where the top ends of the leads 36 are piled on the top ends of the two core wires 31, 32.

Unfortunately, however, while die molding the lower side terminal part of the protector 10, illustrated in FIG. 14, air may be propagated along the covered parts 37 or the wire harness W.

In case the air remains in the die-molded part, the die-molding material is decreased in close adherence. The decreased close adherence leads to deteriorated water cut off function.

In this connection, Japanese Patent No. 6258735 is directed to a protector having a primary sealing layer and a secondary sealing layer. The primary sealing layer and the secondary sealing layer are formed by die molding and the secondary sealing layer is piled on the primary sealing layer. The protector, however, necessitates high manufacturing cost.

Therefore, an object of the present invention is to provide the protector stably formed by die molding and improved in the water cut off function.

SUMMARY

In order to achieve the above-mentioned object, according to one aspect of the invention, a protector (70) with a sensor is provided. The protector (70) includes an installation base member (11) and a hollow part (12).

The installation base member (11) couples to at least one of a peripheral edge of a panel and a peripheral edge of an opening of an automobile body. The panel moves between at least two positions to open and close the opening of the automobile body.

The hollow part (12) is integrally formed with the installation base member (11). The hollow part (12) has two core wires (31, 32) and a space (33). The space (33) is positioned between the two core wires (31, 32). When an object is disposed between the panel and the opening and makes contact with the hollow part (12) when the panel is moved towards a closed position, a corresponding change in an electric signal provides an indication that the object is in the opening.

In a terminal part, the core wires (31, 32) extend in a longitudinal direction, and the core wires (31, 32) are electrically connected with two leads (36, 36). The two leads (36, 36) extend from covered parts (37). The covered parts (37) are tied by a wire harness (W). An insert (80) is made of a non-conductive material. A first end of the insert (80) is inserted in and fills up the space (33). A second end of the insert (80) includes a support member (82A) and a lid (82B). The lid (82B) covers the support member (82A). First channels (83) are formed on the support member (82A). Top ends of the two core wires (31, 32) and top ends of the two leads (36, 36) are fit in the first channels (83). The terminal part is formed by die molding.

A second channel (84) is formed between the support member (82A) and the lid (82B). The covered parts (37) and the wire harness (W) are fit in the second channel (84). The second channel (84) is continuous with the first channels (83).

At least one of the support member (82A) and the lid (82B) includes feeding ports (85, 86) to receive and feed die-molding material into the second channel (84) during die molding.

It is to be noted that the "change in electric signal" includes a change by short between the two core wires, and a change in capacitance.

In addition, according to an aspect of the present invention, the second channel (84) includes pressing parts (87, 88). The pressing parts (87, 88) extend toward an inner side of the second channel (84) and fasten the wire harness (W), fit in the second channel (84).

In addition, according to an aspect of the present invention, the pressing parts (87, 88) on the second channel (84) include at least a first pressing part (87) and a second pressing part (88). The first pressing part (87) is on a first part of the second channel (84) closer to the first channels (83). The second pressing part (88) is on a second part of the second channel (84) opposite to the first part and is at a distance from the first pressing part (87).

In addition, according to an aspect of the present invention, the first channels (83) and the first part of the second channel (84) closer to the first channels (83) are linear. The second part of the second channel (84) opposite to the first part is curved. The wire harness (W) has a U shape and is fit in the second channel (84).

In addition, according to an aspect of the present invention, the support member (82A) and the lid (82B) are made of materials bondable with the die-molding material.

It is to be noted that "bondable" includes welding and fusion bonding.

Symbols in parentheses show constituents or items corresponding to the drawings.

According to the present invention, the first end of the insert is inserted in and fills up the space and the second end of the insert includes the support member and the lid to cover the support member. The first channels are formed on the support member, and the top ends of the two core wires and the top ends of the two leads are fit in the first channels. Also, the second channel is formed between the support member and the lid, and the covered parts and the wire harness are fit in the second channel. The second channel is continuous with the first channels. The terminal part is formed by die molding. With this configuration, the core wires, the leads, the covered parts, and the wire harness are stably fit in the insert and are not exposed from the insert.

In addition, with this configuration, the wire harness is not pressed against the insert during die molding.

In addition, by fitting the wire harness in the insert, the amount of air propagated along the wire harness is decreased.

In addition, at least one of the support member and the lid includes the feeding ports to receive and feed the die-molding material into the second channel during die molding. The die-molding material flows into the insert from the feeding ports while the terminal part of the protector with the sensor is die molded, and fills up a space between the insert and the wire harness. As a result, air does not remain in the space.

With this configuration, air does not remain in the die-molded part or decrease close adherence of the die-molding material. The close adherence, which is not decreased, does not deteriorate water cut off function of the die-molding material.

In addition, the second channel includes the pressing parts. The pressing parts extend toward the inner side of the second channel and fasten the wire harness which is fit in the second channel. With this configuration, the wire harness is fixed on the insert more stably.

Especially, by locally fastening the wire harness with the first pressing part on the first part closer to the first channels and the second pressing part on the second part opposite to the first part, the wire harness is more stably fixed on the insert.

In addition, the first channels and the first part of the second channel closer to the first channels are linear, the second part of the second channel opposite to the first part is curved, and the wire harness which has the U shape is fit in the second channel. Since the second part of the second channel is curved, the die-molding material adheres to the insert over a wider range, and the wire harness and the leads are easier to set on the insert just before die molding. In addition, since the first channels and the first part of the second channel are linear, the wire connection parts are hard to rupture.

DETAILED DESCRIPTION

Figure 1:
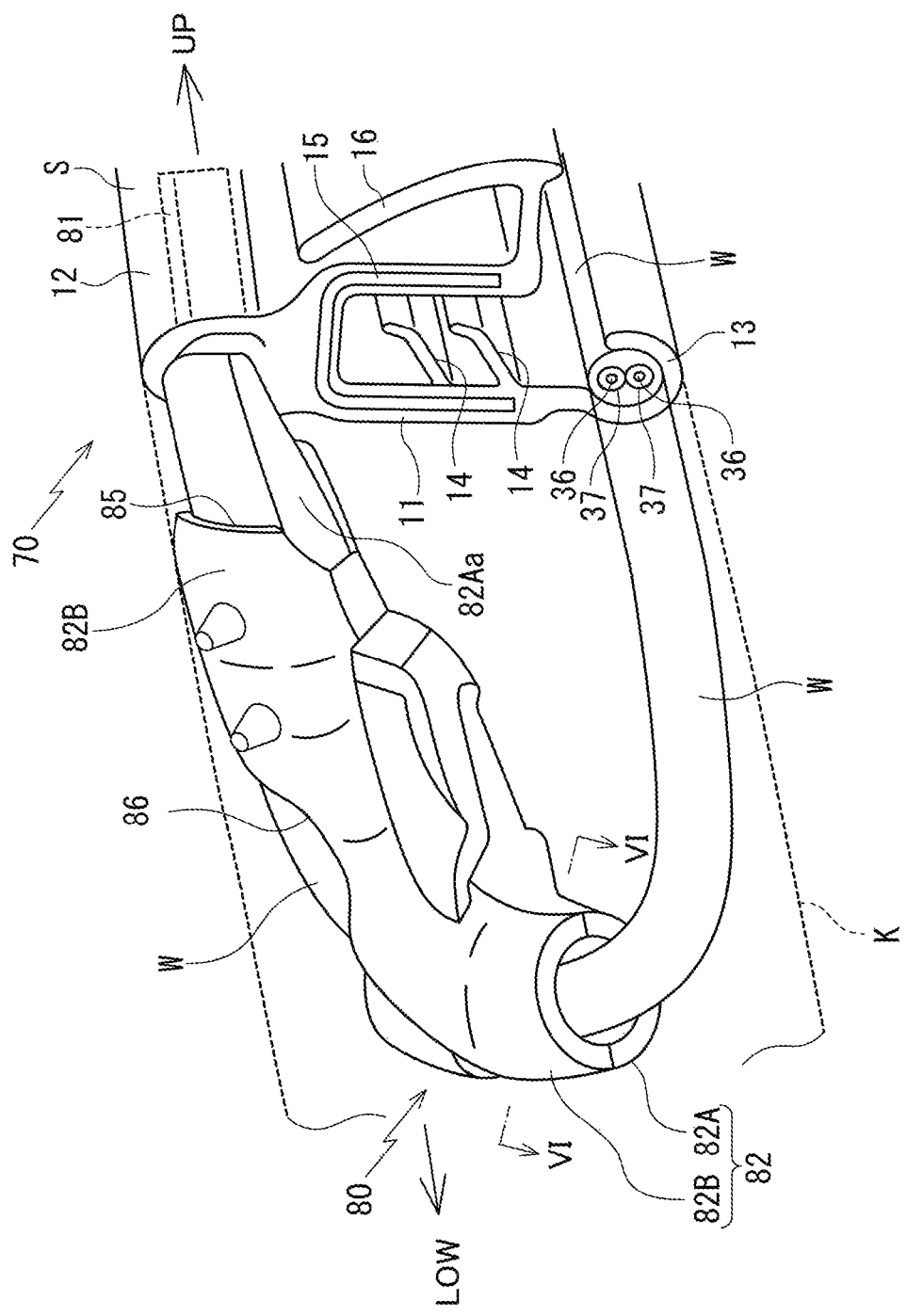
FIG. 1 is a perspective view of an important part of a lower terminal part of a protector according to an embodiment of the present invention with a sensor.

Referring to the Drawings, a protector 70 according to an embodiment of the present invention with a sensor will be described.

Figure 7:
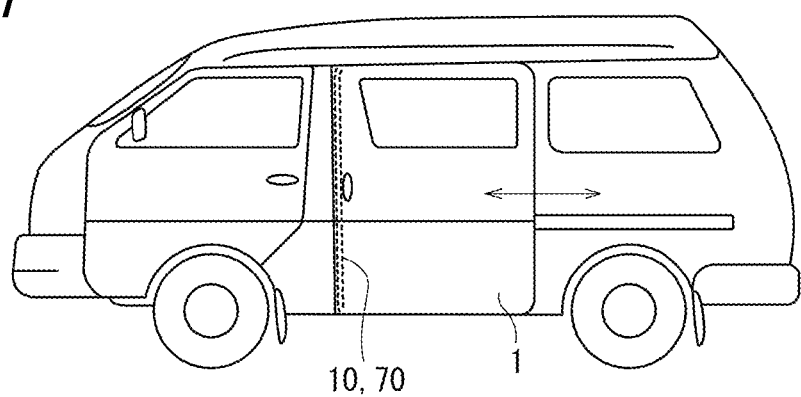
FIG. 7 is a side view of an automobile with a sliding door which opens and closes an opening of an automobile body.
Figure 9:
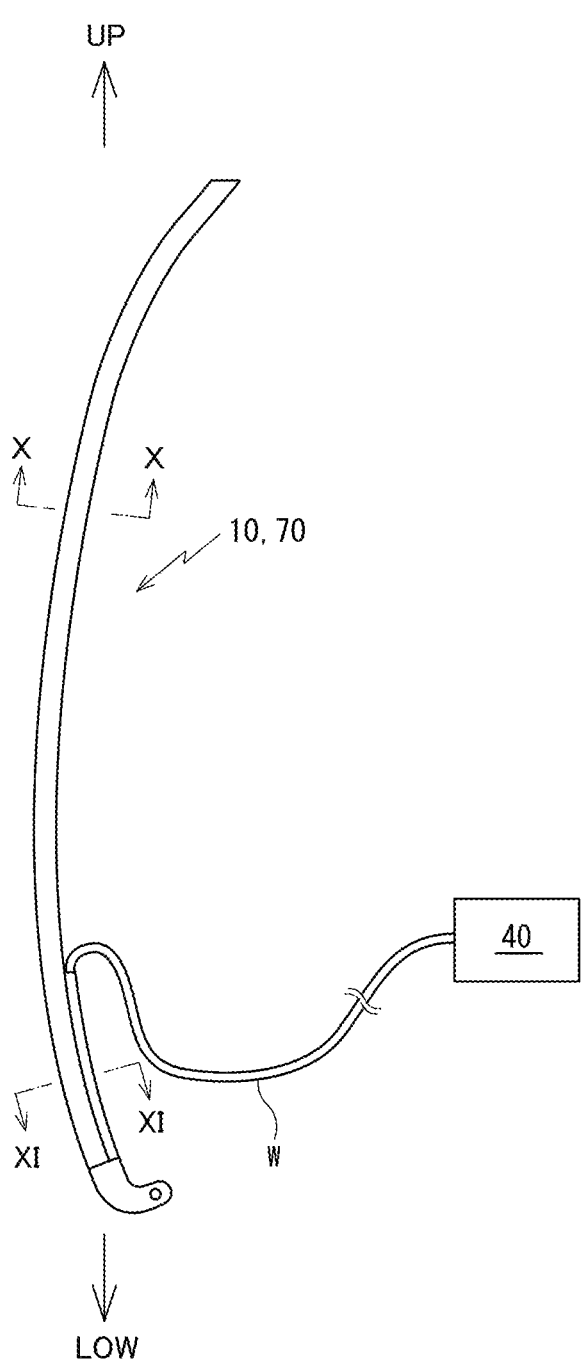
FIG. 9 is a side view of a protector illustrated in FIG. 7 with a sensor.

The protector 70 couples to a front end surface of a sliding door 1 and extends toward a front part of an automobile body from the front end surface. The sliding door 1 moves between at least two positions to open and close an opening of the automobile body illustrated in FIG. 7. A sensor (pressure sensitive sensor) S is fixed in the protector 70 and outputs a corresponding electric signal upon detecting an object such as a part of human bodies (fingers, hands, or legs) between the sliding door 1 and the opening of the automobile body (may also be front door or side door). The present invention and the prior art include configurations illustrated in FIG. 9 to FIG. 11 in common. The present invention differs from the prior art in configuration of an insert 80 of the present invention and inserts 25, 50 of the prior art. When constituents or items correspond to those in prior arts, the same symbols are used.

Figure 10:
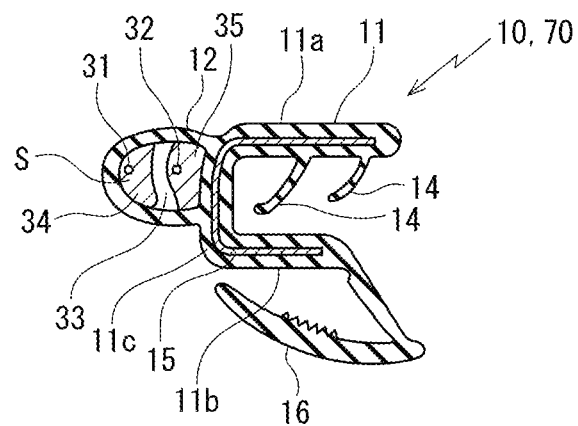
FIG. 10 is an enlarged cross sectional view of the protector taken along line X-X of FIG. 9.
Figure 11:
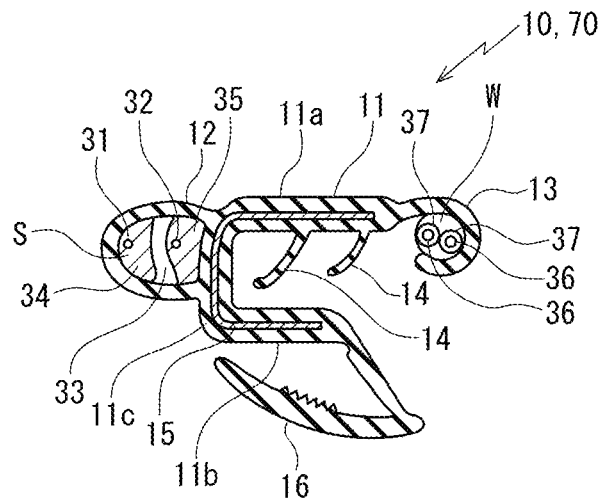
FIG. 11 is an enlarged cross sectional view of the protector taken along line XI-XI of FIG. 9.
Figure 12:
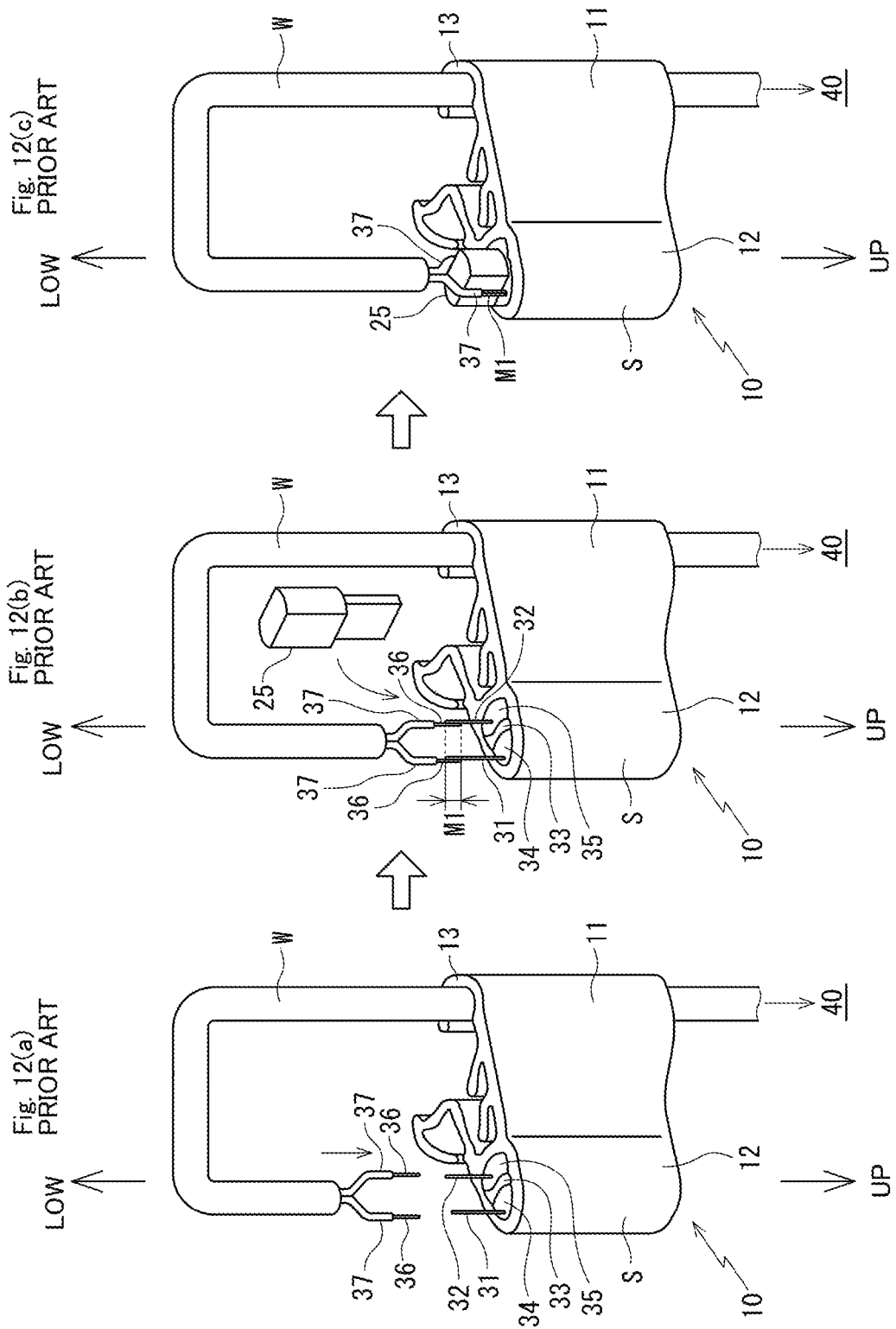
FIG. 12(a), FIG. 12(b), and FIG. 12(c) are perspective views of a lower terminal part of a protector according to a prior art with a sensor before die molding with the views arranged according to the timeline.
Figure 13:
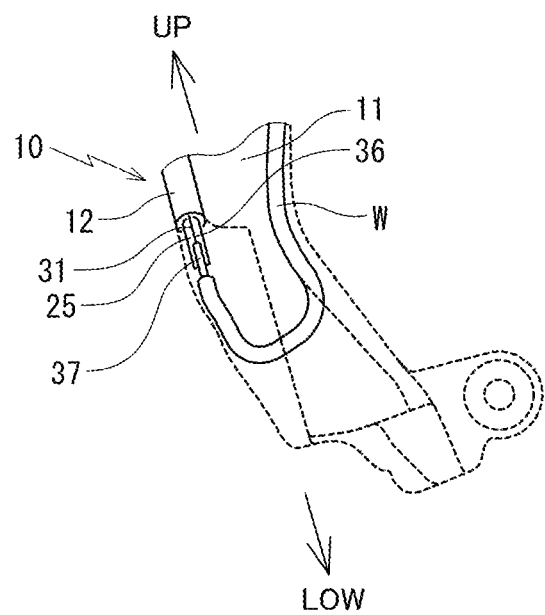
FIG. 13 is a perspective view of a structural outline of the lower terminal part of the protector according to the prior art after die molding.
Figure 14:
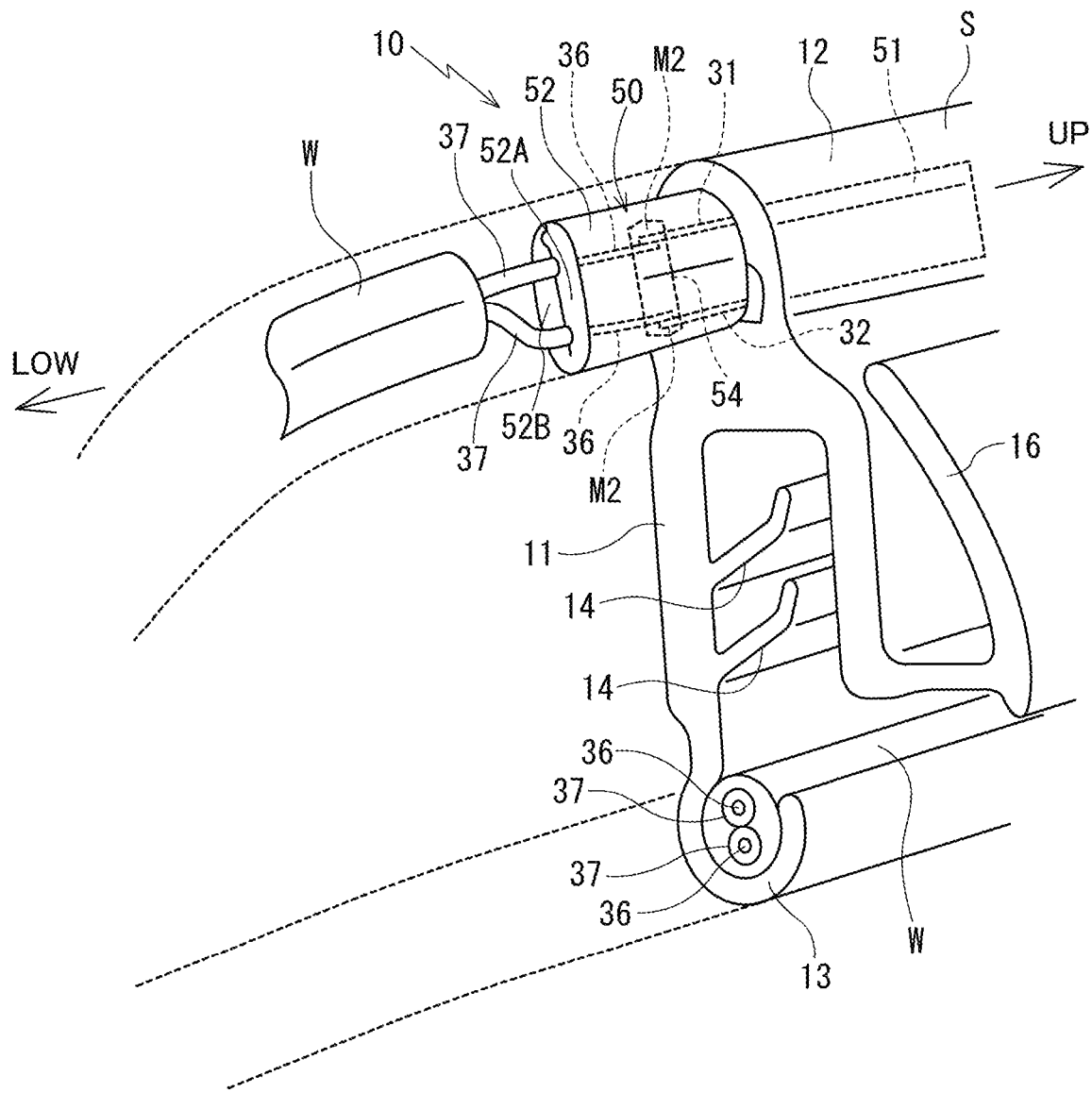
FIG. 14 is a perspective view of a structural outline of a lower terminal part of another protector according to the prior art with a sensor after die molding.

As illustrated in FIG. 10 and FIG. 11, in the same manner as a protector 10 according to the prior art, the protector 70 includes an installation base member 11, a hollow part 12, and a sensor (pressure sensitive sensor) S. The installation base member 11 directly couples to a flange (illustration omitted) formed on the sliding door 1. The hollow part 12 is integrally formed with the installation base member 11. The hollow part 12 makes contact with the object when the object including the finger is disposed between the front end surface of the sliding door 1 and the opening of the automobile body. The front end surface faces the opening of the automobile body. The sensor S is fixed in the hollow part 12 and outputs a corresponding electric signal upon detecting the object. The hollow part 12 has two core wires (electrode wires (including stranded wires)) 31, 32, rubber like elastic bodies 34, 35, and a space 33. The core wires 31, 32 extend in an upper and lower direction (longitudinal direction which is a direction parallel to the peripheral edge of the opening) and are embedded in the rubber like elastic bodies 34, 35. The rubber like elastic bodies 34, 35 have conductivity. The space 33 is positioned between the rubber like elastic bodies 34, 35. When an object is disposed between the panel and the opening and makes contact with the hollow part when the panel is moved towards a closed position, a corresponding change in electric signal provides an indication that the object is in the opening. It is to be noted that the "change in electric signal" includes a change by short between two core wires 31, 32, and a change in capacitance. The installation base member 11 has a plurality of holding lips 14, 14 formed inside and a core 15 embedded. The core 15 has a substantially U-shaped cross section and increase rigidity of the installation base member 11. In addition, a seal lip 16 is provided on an outer-cabin side wall 11b of the installation base member 11.

In a lower terminal part of the protector 70, as illustrated in FIG. 1, the insert 80 fills up the space 33 as an opening on the hollow part 12 and closes the space 33.

Figure 2:
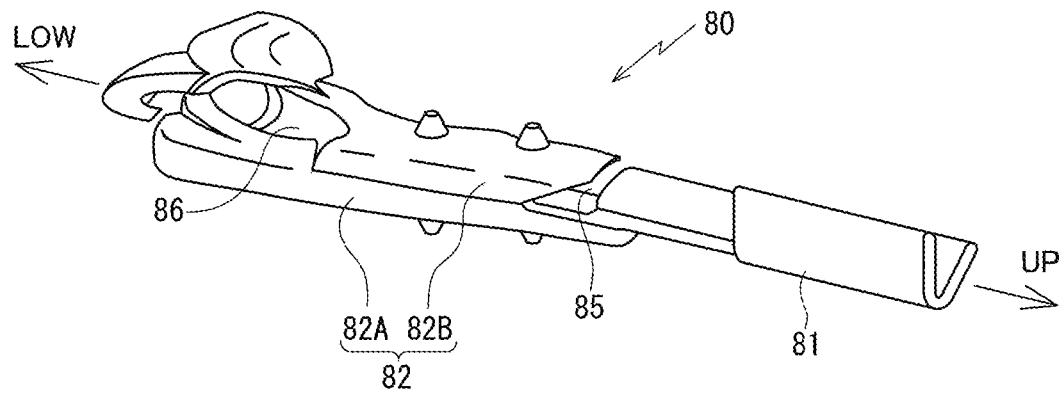
FIG. 2 is a perspective view of an insert of the protector illustrated in FIG. 1.
Figure 3:
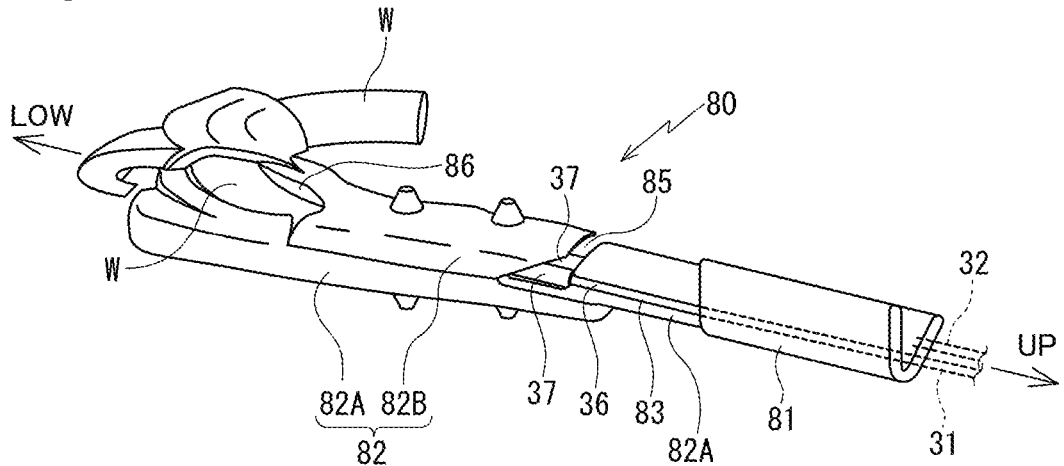
FIG. 3 is a perspective view of the insert of the protector illustrated in FIG. 1 with a wire harness fixed on the insert.

Examples of non-conductive material usable as the insert 80 include polypropylene, polyethylene, polyethylene terephthalate, nylon, 6 nylon, and 6-6 nylon. As illustrated in FIG. 2, the insert 80 includes an insertion part 81 on a first end and a protrusion part 82 on a second end. The insertion part 81 has a shape of a plate.

The insertion part 81 has a cross sectional shape which is substantially the same as or slightly larger than the space 33. When the insertion part 81 is inserted in the space 33 of the hollow part 12, the insertion part 81 tightly fills up the space 33 and prevents malfunction of the sensor caused by the die-molding material flowing into the space 33 during die molding.

Figure 4:
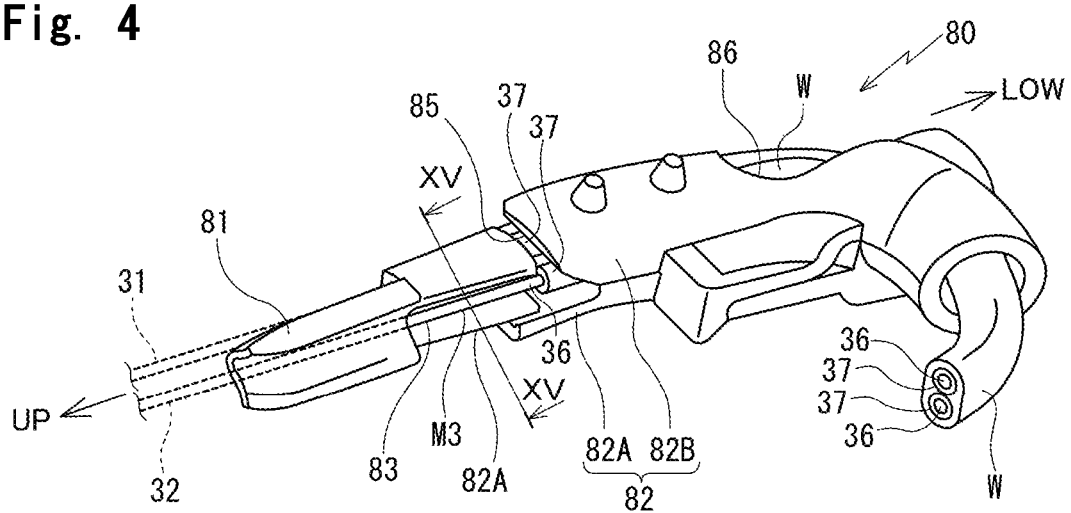
FIG. 4 is a perspective view of the insert of the protector illustrated in FIG. 1 with the wire harness fixed on the insert, taken along an angle different from FIG. 3.
Figure 5:
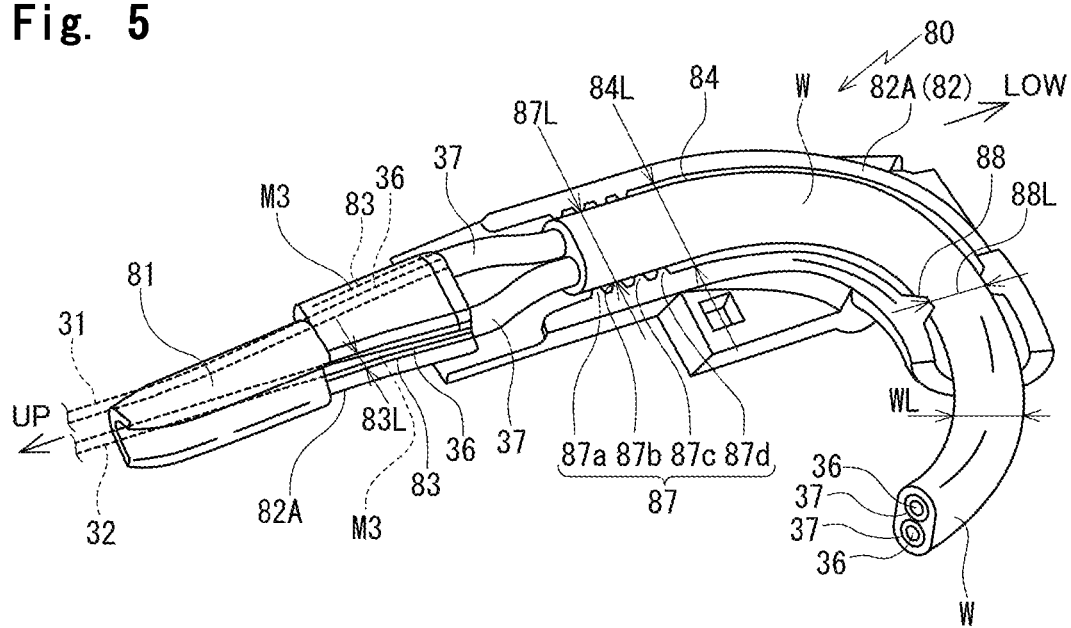
FIG. 5 is a perspective view of the insert illustrated in FIG. 4, with a lid removed.

In the present embodiment, the insertion part 81 has the cross sectional shape which is substantially the same as the space 33. In case the space 33 has a V-shaped cross section, the insertion part 81 also has the V-shaped cross section as illustrated in FIG. 4 and FIG. 5.

The protrusion part 82 includes a support member 82A and a lid 82B to cover the support member 82A. First channels 83, 83 are formed on the support member 82A. Top ends of the two core wires 31, 32 and top ends of the two leads 36, 36 are piled up and are fit in the first channels 83. The first channels 83 are two separate channels at a distance from each other and are formed on a front part of the support member 82A, that is closer to the insertion part 81. The first channels 83 extend in the longitudinal direction toward the protrusion part 82 from a border between the insertion part 81 and the protrusion part 82.

In the present embodiment, channel widths 83L of the first channels 83 are longer than diameters of the core wires 31, 32 and diameters of the two leads 36, 36. Accordingly, the two core wires 31, 32 and the two leads 36, 36, which are piled up, are easily fit in the first channels 83 without applying an extra force.

Figure 15:
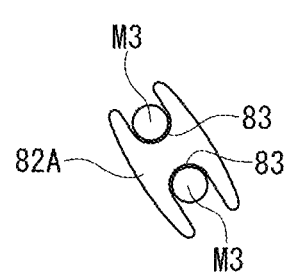
FIG. 15 is an enlarged cross sectional view of the insert taken along line XV-XV of FIG. 4.

While FIG. 15 illustrates the configuration of the insert 80 according to the present embodiment, this should not be construed in a limiting sense. In the present invention, it is only required that the two core wires 31, 32 and the two leads 36, 36, which are piled up, are fit in the first channels 83.

FIG. 5 illustrates a second channel 84. The second channel 84 is formed between the support member 82A and the lid 82B. The covered parts 37 and the wire harness W are fit in the second channel 84. The second channel 84 is continuous with the first channels 83. A channel width 84L of the second channel 84 is longer than the channel widths 83L of the first channels 83 and a diameter WL of the wire harness W. Accordingly, the wire harness W is easily fit in the second channel 84 without applying the extra force.

As illustrated in FIG. 5, the insert 80 has a substantially J shape. Specifically, the insertion part 81 of the insert 80 is linear and a second (lower) end of a second (lower) part of the protrusion part 82 is curved.

Accordingly, the first channels 83 on the insertion part 81 and a first (upper) part of the second channel 84 on the protrusion part 82 are linear. The second (lower) part of the second channel 84 on the protrusion part 82 is curved. The first (upper) part of the second channel 84 is closer to the first channels 83. The second part of the second channel 84 is opposite to the first part. The wire harness W extends toward a lower part of the automobile body, is turned to extend toward an upper part, and forms a U shape. The harness W, which has the U shape, is fit in the second channel 84.

In addition, the second channel 84 includes pressing parts 87, 88. The pressing parts 87, 88 extend toward an inner side of the second channel 84 and fasten the wire harness W, fit in the second channel 84.

The first pressing part 87 is on the first (upper) part of the second channel 84 closer to the first channels 83, and fastens a first (upper) end of the wire harness W. The second pressing part 88 is on the second (lower) part of the second channel 84 opposite to the first (upper) part and is at a distance from the first pressing part 87. The second pressing part 88 fastens a part of the wire harness W turned toward the upper part.

The first pressing part 87 and the second pressing part 88 are annular and extend toward the inner side of the second channel 84. An inside diameter 87L of the first pressing part 87 and an inside diameter 88L of the second pressing part 88 are shorter than the diameter WL of the wire harness W. Accordingly, the first pressing part 87 and the second pressing part 88 locally tighten up the wire harness W.

While in the present embodiment, the first pressing part 87 includes four annular layers (87*a*, 87*b*, 87*c*, 87*d*) with an interval between two adjacent layers, and the second pressing part 88 includes a singular layer, this should not be construed in a limiting sense.

In addition, as illustrated in FIG. 1 and FIG. 4, a feeding port 85 is formed between the support member 82A and a first (upper) end of the lid 82B. Also, a feeding port 86 is formed at a center of the lid 82B. The feeding ports 85, 86 receive and feed die-molding material K into the second channel 84 during die molding.

The two core wires 31, 32 and the two leads 36, 36 are piled up and are fit in the first channels 83 on the support member 82A of the insert 80, and the covered parts 37 and the wire harness W are fit in the second channel 84. The lid 82B is fixed to the support member 82A and covers the support member 82A. In the lower terminal part of the protector 70, as illustrated in FIG. 1, the insertion part 81 of the insert 80 is inserted in and fills up the space 33 as the opening on the hollow part 12 and closes the space 33.

Then, the lower terminal part of the protector 70 is die molded. As a result, the insert 80 is embedded in the die-molded part, not exposed.

Figure 6:
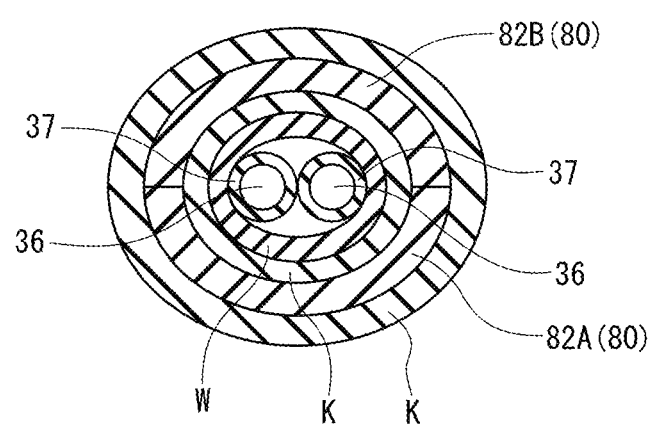
FIG. 6 is an enlarged cross sectional view of the protector taken along line VI-VI of FIG. 1.

The die-molding material K flows into the insert 80 through the feeding ports 85, 86, formed on the support member 82A and the lid 82B of the insert 80 during die molding. As illustrated in FIG. 6, which is taken along line VI-VI of FIG. 1, the die-molding material K fills up a space between the wire harness W and the insert 80, that is between the wire harness W and a combination of the support member 82A and the lid 82B. As a result, air does not remain in the space.

With this configuration, air does not remain in the die-molded part or decrease close adherence of the die-molding material K. The close adherence, which is not decreased, does not deteriorate water cut off function.

Material of the insert 80 and material of the die-molding material K may be similar in hardness and have flexibility. In some embodiments, the insert 80 is made of PP and the die-molding material K is made of TPO.

With this configuration, the insert 80 and the die-molding material K, as bonded together, yield sense of integrity, and the protector 70 becomes easier to handle. The hardness of the insert 80 and the die-molding material K is preferably in a range of 20 to 90 JISA, which is soft, of Japan Industrial Standards (JIS), more preferably in a range of 40 to 90 JISA. In case the hardness is less than 40 JISA, the die-molded part may perform an insufficient function (including assemblablity to the automobile body). In case the hardness is less than 20 JISA, the die-molded part performs the insufficient function. Another possible embodiment is that the insert 80 is covered by other types of resin material (including adhesive) to prevent infiltration of water into inner electric components or wiring. In this configuration, the other types of resin material which is as soft as or softer (lower in hardness) than the die-molding material K does not hamper the sense of integrity.

Another possible embodiment is that the material of the insert 80 and the material of the die-molding material K have compatibility. With this configuration also, the insert 80 and the die-molding material K yield the sense of integrity, and the protector 70 becomes easier to handle. In case the insert 80 is covered by the other types of resin material (including adhesive) to prevent infiltration of water, the compatibility simplifies selection of the adhesive to bond with the insert 80 and the die-molding material K firmly. Another possible embodiment is the material of the insert 80 and the material of the die-molding material K are so similar in property as to fuse. With this configuration, the insert 80 closely adheres to the die-molding material K during die molding without using adhesive, and infiltration of water into the inner electric components or wiring is prevented. It is to be noted that "compatibility" in a narrow sense indicates that the material of the insert 80 and the material of the die-molding material K are so similar in property as to fuse. In case one material is TPO, the other material is polypropylene, polyethylene, or TPE which includes TPO or olefinic resin. Examples of TPE which includes olefinic resin include stylene thermoplastic elastomer (TPS). In case one material is TPS, the other material is, under the condition that TPS includes olefinic resin, polypropylene, polyethylene, or TPE which includes TPO or olefinic resin. The other material is compatible with the TPS and so similar in property as to weld or fuse.

While in the present embodiment the protrusion part 82 of the insert 80 is kept closed by fitting the lid 82B into the support member 82A from an upper side and anchoring the lid 82B to the support member 82A, this should not be construed in a limiting sense. Another possible embodiment is that the lid 82B openably couples to the support member 82A with a hinge or a thin part (illustration omitted).

While in the present embodiment two feeding ports 85, 86 are formed, this should not be construed in a limiting sense. Another possible embodiment is that at least one extra feeding port is formed on at least one of the support member 82A and the lid 82B (illustration omitted).

While in the present embodiment the protector 70 couples to the sliding door 1, which moves between at least two positions, this should not be construed in a limiting sense. Another possible embodiment is that the protector 70 couples to the opening of the automobile body and the sensor of the protector 70 outputs the corresponding signal upon detecting the object between the opening of the automobile body and the sliding door 1.

Figure 8:
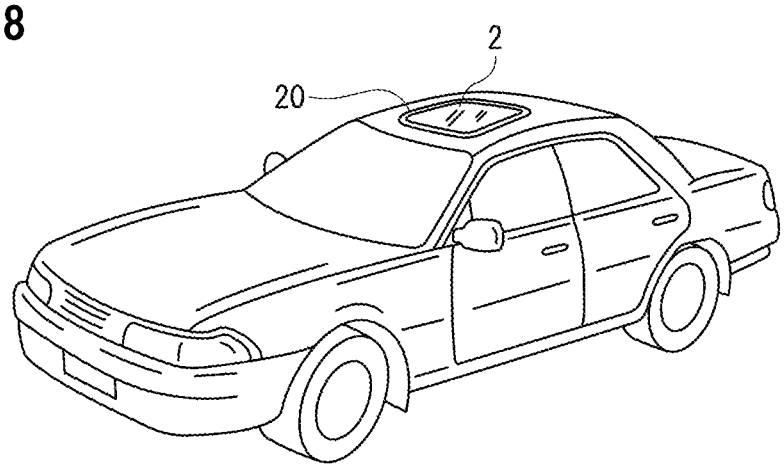
FIG. 8 is a perspective view of an automobile with a sun roof.

Still another possible embodiment is that the protector 70 couples to a back door or a sun roof 2 (FIG. 8).

We claim:

1. A protector with a sensor, the protector comprising:
an installation base member operably couplable to at least one of a peripheral edge of a panel and a peripheral edge of an opening of an automobile body, the panel being movable between at least two positions to open and close the opening of the automobile body; and
a hollow part integrally formed with the installation base member, the hollow part having two core wires and a space provided therein, the space being positioned between the two core wires,
wherein:
when an object is disposed between the panel and the opening and makes contact with the hollow part when the panel is moved towards a closed position, an electric signal provides an indication that the object is in the opening,
in a terminal part, the core wires extend in a longitudinal direction, the core wires are electrically connected with two leads, the two leads extend from covered parts, the covered parts are tied by a wire harness, a first end of an insert made of a non-conductive material is inserted in and fills up the space, a second end of the insert includes a support member and a lid configured to cover the support member, first channels are formed on the support member, top ends of the two core wires and top ends of the two leads are fit in the first channels, and the terminal part is formed by die molding,
a second channel is formed between the support member and the lid, the covered parts and the wire harness being fit in the second channel, and the second channel being continuous with the first channels, and
at least one of the support member and the lid includes feeding ports configured to receive and feed die-molding material into the second channel during die molding.

2. The protector as claimed in claim 1, wherein the second channel includes pressing parts which extend toward an inner side of the second channel, the pressing parts being configured to fasten the wire harness fit in the second channel.

3. The protector as claimed in claim 2, wherein:
the first channels and the first part of the second channel closer to the first channels are linear,
the second part of the second channel opposite to the first part is curved, and
the wire harness has a U shape and is fit in the second channel.

4. The protector as claimed in claim 3, wherein the support member and the lid are made of materials bondable with the die-molding material.

5. The protector as claimed in claim 2, wherein the support member and the lid are made of materials bondable with the die-molding material.

6. The protector as claimed in claim 2, wherein the pressing parts on the second channel at least include:
a first pressing part on a first part of the second channel closer to the first channels, and
a second pressing part on a second part of the second channel opposite to the first part, the second pressing part being at a distance from the first pressing part.

7. The protector as claimed in claim 6, wherein:
the first channels and the first part of the second channel closer to the first channels are linear,
the second part of the second channel opposite to the first part is curved, and
the wire harness has a U shape and is fit in the second channel.

8. The protector as claimed in claim 7, wherein the support member and the lid are made of materials bondable with the die-molding material.

9. The protector as claimed in claim 6, wherein the support member and the lid are made of materials bondable with the die-molding material.

10. The protector as claimed in claim 1, wherein:
the first channels and the first part of the second channel closer to the first channels are linear,
the second part of the second channel opposite to the first part is curved, and
the wire harness has a U shape and is fit in the second channel.

11. The protector as claimed in claim 10, wherein the support member and the lid are made of materials bondable with the die-molding material.

12. The protector as claimed in claim 1, wherein the support member and the lid are made of materials bondable with the die-molding material.

* * * * *